US009692091B2

United States Patent
Yamamoto et al.

(10) Patent No.: US 9,692,091 B2
(45) Date of Patent: Jun. 27, 2017

(54) BATTERY PACK HAVING A COOLING STRUCTURE

(71) Applicant: DENSO CORPORATION, Kariya, Aichi-pref. (JP)

(72) Inventors: Hiroyoshi Yamamoto, Nagoya (JP); Yoshimitsu Inoue, Chiryu (JP)

(73) Assignee: DENSO CORPORATION, Kariya (JP)

( * ) Notice: Subject to any disclaimer, the term of this patent is extended or adjusted under 35 U.S.C. 154(b) by 140 days.

(21) Appl. No.: 14/315,966

(22) Filed: Jun. 26, 2014

(65) Prior Publication Data

US 2015/0004459 A1    Jan. 1, 2015

(30) Foreign Application Priority Data

Jun. 27, 2013   (JP) .................................. 2013-135397

(51) Int. Cl.
| | |
|---|---|
| *H01M 10/50* | (2006.01) |
| *H01M 10/613* | (2014.01) |
| *H01M 10/625* | (2014.01) |
| *H01M 10/6551* | (2014.01) |
| *H01M 10/6563* | (2014.01) |

(52) U.S. Cl.
CPC ....... *H01M 10/613* (2015.04); *H01M 10/625* (2015.04); *H01M 10/6551* (2015.04); *H01M 10/6563* (2015.04); *H01M 2220/20* (2013.01)

(58) Field of Classification Search
CPC ............. H01M 10/613; H01M 10/625; H01M 10/6551; H01M 10/6563; H01M 2220/20
See application file for complete search history.

(56) References Cited

U.S. PATENT DOCUMENTS

| | | | |
|---|---|---|---|
| 2014/0038007 A1* | 2/2014 | Ahn ..................... | H01M 2/1077 429/62 |
| 2014/0295224 A1 | 10/2014 | Inoue | |
| 2016/0104925 A1* | 4/2016 | Xiang ................. | H01M 2/0267 429/82 |

FOREIGN PATENT DOCUMENTS

| | | | | |
|---|---|---|---|---|
| JP | 2004-311157 | * 11/2004 | ............ | H01M 10/50 |
| JP | 2009-211829 | 9/2009 | | |
| JP | 2009-266773 | 11/2009 | | |
| JP | 2013-16301 | 1/2013 | | |

OTHER PUBLICATIONS

Office Action (2 pgs.) dated Jun. 2, 2015 issued in corresponding Japanese Application No. 2013-135397 with an at least partial English-language translation (3 pgs.).
Inoue, entitled "Battery Pack", U.S. Appl. No. 14/242,100, filed Apr. 1, 2014 (35 pages).

* cited by examiner

*Primary Examiner* — Raymond Alejandro
(74) *Attorney, Agent, or Firm* — Nixon & Vanderhye PC (57) ABSTRACT

In a battery pack having an improved cooling structure, unit cells, an internal cooling fan and a drive motor are arranged in an inside space of a housing. The inside space of the housing is completely sealed. The drive motor drives the internal cooling fan to supply cooling air. The cooling air circulates in the inside space of the housing to cool the unit cells. Radiation fins are formed on at least one specific exterior surface of the housing. The specific exterior surface has a superior radiation capability which is higher than that of each of the other exterior surfaces of the housing. The cooling air is supplied in turn surfaces of the unit cells and interior surface of the housing corresponding to the exterior surface on which the radiation fins are formed.

17 Claims, 8 Drawing Sheets

FIG.14

BATTERY PACK HAVING A COOLING STRUCTURE

CROSS-REFERENCE TO RELATED APPLICATION

This application is related to and claims priority from Japanese Patent Application No. 2013-13539 filed on Jun. 27, 2013, the contents of which are hereby incorporated by reference.

BACKGROUND OF THE INVENTION

1. Field of the Invention

The present invention relates to battery packs in which a plurality of unit cells is arranged to be connected together and stored in a housing.

2. Description of the Related Art

A patent document 1, Japanese patent laid open publication No. 2004-311157, has disclosed a conventional battery pack having a cooling structure capable of introducing outside air into the inside of the battery pack to cool a plurality of unit cells. In order to effectively perform a temperature control of each of the unit cells, the unit cells are arranged at regular intervals. The introduced outside air is used as cooling air and supplied between the unit cells arranged at regular intervals, and the cooling air containing heat energy is then discharged to the outside of the battery pack.

However in the structure of the conventional battery pack according to the patent document 1 as previously described, it is difficult to completely radiate heat energy of the unit cells by cooling air at one time, so that a large temperature difference occurs between the unit cells and the cooling air passed through the unit cells 11. In order to further decrease the temperature of the unit cells in the battery pack, it is necessary to use a fan to supply additional cooling air. However, noise such as fan noise is generated and the magnitude of fan noise is increased when a rotary speed of the fan becomes high in order to further increase the cooling capability for the unit cells. Still further, a temperature of each of the unit cells varies between the upstream side and the downstream side thereof even if the unit cells are arranged at regular intervals.

SUMMARY

It is therefore desired to provide a battery pack comprising a plurality of unit cells capable of cooling the unit cells with high efficiency and suppressing generation of fan noise.

An exemplary embodiment provides a battery pack. The battery pack has a plurality of unit cells, a housing, a drive motor, an internal cooling fan and a radiation section. The housing has at least six surfaces in which the unit cells are stored in an inside space of the housing. The drive motor is arranged in the inside space of the housing. The internal cooling fan is arranged in the inside space of the housing and configured to supply a cooling air to the inside space of the housing when driven by the drive motor. The radiation section is formed on at least one specific exterior surface selected from the exterior surfaces of the housing. The specific exterior surface has a radiation capability which is higher than a radiation capability of each of the other exterior radiation surfaces of the housing. In the battery pack having the structure previously described, the internal cooling fan is arranged in the inside space of the housing to supply the cooling air to pass on surfaces of the unit cells and interior surfaces of the housing which corresponds to the exterior surfaces including the specific exterior surface of the housing.

According to the battery pack having the structure previously described, the internal cooling fan and the drive motor are arranged in the inside space of the housing. The drive motor drives the internal cooling fan to supply the cooling air to circulate in the inside space of the housing. This makes it possible to cool the unit cells with high efficiency without increasing of fan noise. That is, because the internal cooling fan and the drive motor are arranged in the inside space of the housing, it is possible to suppress leakage of fan noise to the outside of the housing.

Further the radiation section is formed on at least one exterior surface of the housing, which has a superior radiation capability when compared with the radiation capability of each of the other exterior surfaces of the housing. Further, the internal cooling fan supplies the cooling air to pass along the interior surface of the housing which corresponds to the specific exterior surface on which the radiation fins are formed. This makes it possible to perform heat exchange between the outside air and the cooling air as an interior cooling air of a high temperature having heat energy absorbed from the unit cells. The heat energy generated in the unit cells is thereby discharged from the radiation fins to the outside of the battery pack. It is therefore possible to cool the battery pack with high efficiency without leakage of fan noise generated by the internal cooling fan.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Hereinafter, various embodiments of the present invention will be described with reference to the accompanying drawings. In the following description of the various embodiments, like reference characters or numerals designate like or equivalent component parts throughout the several diagrams.

First Exemplary Embodiment

A description will be given of the battery pack 10 according to a first exemplary embodiment with reference to FIG. 1, FIG. 2 and FIG. 3.

Figure 1:
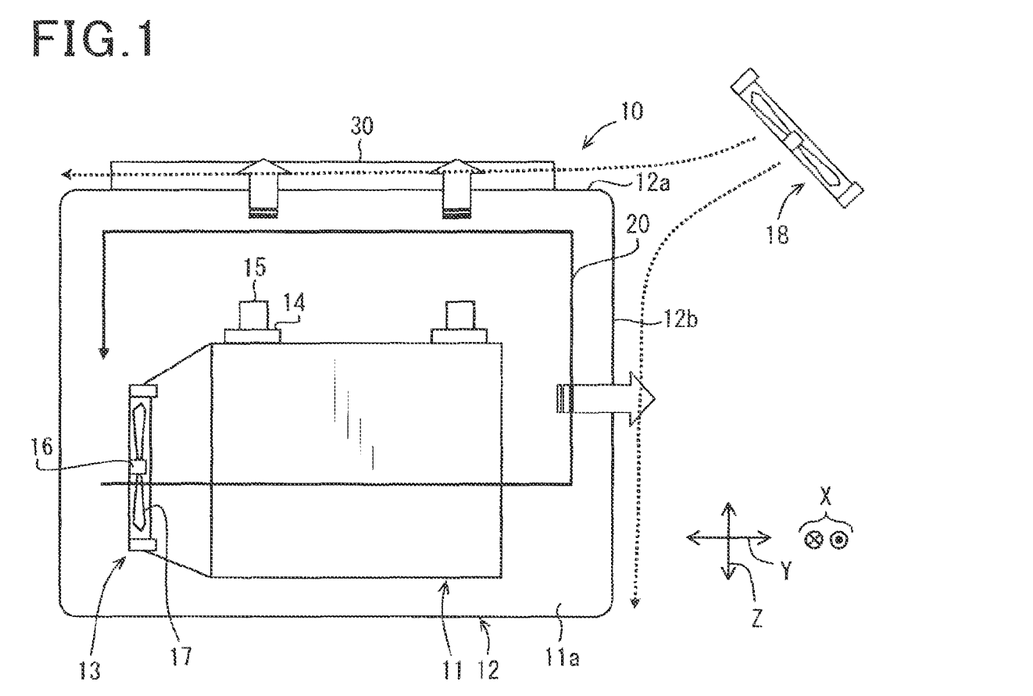
FIG. 1 is a side view showing a structure of a battery pack 10 according to a first exemplary embodiment of the present invention.

FIG. 1 is a side view showing a structure of a battery pack 10 according to the first exemplary embodiment. FIG. 2 is a plan view showing the structure of the battery pack 10 shown in FIG. 1.

Figure 2:
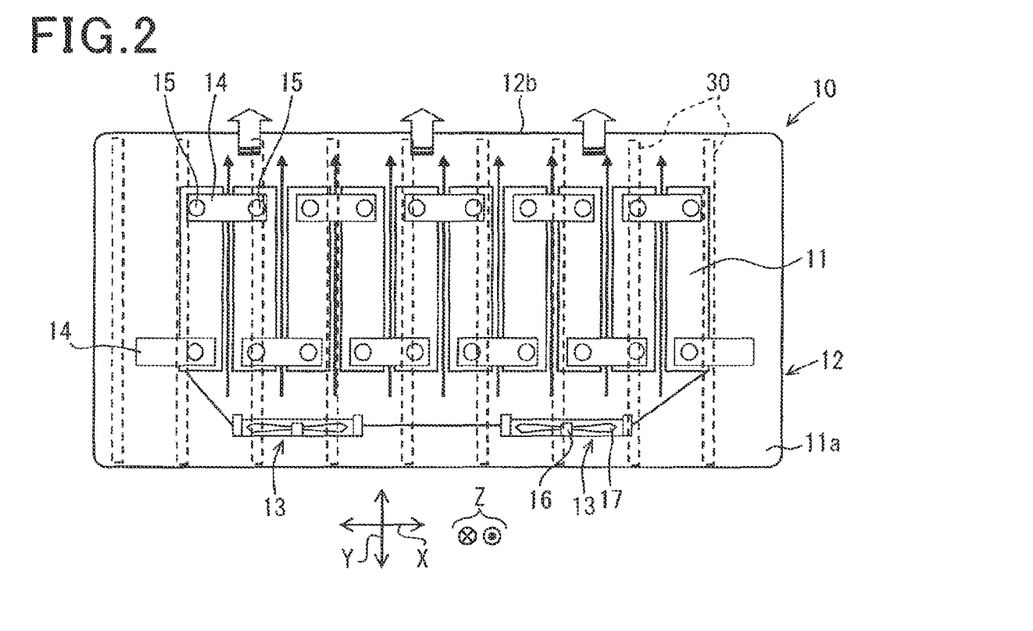
FIG. 2 is a plan view showing the structure of the battery pack 10 according to the first exemplary embodiment of the present invention.

As shown in FIG. 1 and FIG. 2, the battery pack 10 is comprised of a plurality of unit cells 11 and a housing 12. The unit cells 11 are stored and arranged in an inside space 11a of the housing 12 of the battery pack 10. For example, the battery pack 10 can be used for hybrid motor vehicles, which are well known. A hybrid motor vehicle is equipped with an internal combustion engine and an electric rotary machine driven by electric power supplied from the battery pack 10. The internal combustion engine and the electric rotary machine are main power sources of the hybrid motor vehicles.

For example, each of the unit cells 11 is a rechargeable battery such as nickel hydrogen rechargeable battery, lithium ion rechargeable battery, or organic radical rechargeable battery. The unit cells 11 are stored in the housing 12 and arranged under a driver seat or a passenger seat (which is the seat next to the driver seat), in a luggage space or a space between the driver seat and the passenger seat of the hybrid motor vehicle.

The housing 12 is a molded unit having a box-like shape made of aluminum plate of a steel plate so that the unit cells are stored and completely sealed in the housing 12. The housing 12 has at least six exterior surfaces and six interior surfaces corresponding to the exterior surfaces when the battery pack 10 according to the first exemplary embodiment has a rectangular parallelepiped having six surfaces. A thickness of the housing 12 is omitted from FIG. 1 and FIG. 2 for brevity and easy understanding.

The inside space 11a of the housing 12 is completely sealed in order to prevent the entrance of dust and contaminations into the inside space 11a of the housing 12. It is acceptable to discharge gases generated in the inside space 11a of the housing 12 by using a relief valve (omitted from the drawings).

As shown in FIG. 2, the unit cells 11 are arranged at regular intervals in the inside space 11a of the housing 12. The side surfaces (as the exterior side surfaces and the interior side surfaces) of the housing 12 act as a heat radiation section through which heat energy generated in the unit cells 11 is radiated to the outside, i.e. the outside air of the battery pack 10. The exterior side surfaces and the interior side surfaces of the housing 12 will also be referred to as the "side surfaces" for brevity.

As shown in FIG. 2, a direction along which the unit cells it are arranged is designated with the direction X. As shown in FIG. 1, a direction along which the side surface of the unit cells 11 is arranged is designated with the direction Z. Further, as shown in FIG. 1 and FIG. 2, a direction which is perpendicular to the direction X and the direction Z is designated with the direction Y. That is, FIG. 1 shows the structure of the battery pack 10 in Y-Z plane. FIG. 2 shows the structure of the battery pack 10 in X-Y plane.

As shown in FIG. 1, the unit cells 11 are arranged at a central section in the housing 12 in the direction Y and the direction Z. An air passage 20 is formed around the unit cells 11 in the housing 12 in order to flow cooling air. The air passage 20 is also formed along the direction Y over the unit cells 11. Still further, the air passage 20 is formed along the direction 2 at the right side of the unit cells 11. Internal cooling air supply units 13 are arranged at the left side of the plurality of the unit cells 11.

Heat energy generated in the unit cells 11 is radiated through bus bars 14 connected to the unit cells 11 in addition to that heat energy of the unit cells 11 is radiated from the surfaces of each of the unit cells 11. Each of the bus bars 14 is made of conductive metal plate through which terminals 15 of the adjacent unit cells are electrically connected together.

The adjacent unit cells 11 are connected in series through the corresponding bus bar 14, and the plurality of the unit cells 11 is sequentially connected in series through the bus bars 14. For example, it is possible for each of the bus bars 14 to have a curved shape. It is acceptable for the bus bar 14 to have a length which is more than its sufficient length for performing electrical connection between the unit cells 11. It is also possible for the bus bar 14 to have a large curved shape such as a mountain-like shape. It is acceptable to have a fan in order to improve the heat radiation capability. It is possible to forge and cut a copper member to form the bus bars 14 in order to form a fin to each or some of the bus bars 14. For example, it is also acceptable to join and fix another fin to the bus bars 14 by welding.

As shown in FIG. 1 and FIG. 2, a radiation section is comprised of a plurality of radiation fins 30. The radiation fins 30 are formed on an exterior upper surface 12a of the housing 12.

Through the description, the specific exterior surface used in the claims indicates one or more exterior surfaces of the housing 12 on which the radiation fins 30 are formed. For easy understanding, the radiation fins 30 are designated with dotted lines shown in FIG. 2. The radiation fins 30 are formed on at least one exterior surface of the housing 12, which is predetermined in advance. Because the exterior upper surface 12a on which the radiation fins 30 are formed has an increased radiation area when compared with the radiation area of the other exterior surfaces of the housing 12, the exterior upper surface 12a having the radiation fins 30 has a superior radiation capability. In the structure of the battery pack 10 according to the first exemplary embodiment, the exterior upper surface 12a of the housing 12 having the radiation fins 30 has the maximum surface area (or a higher surface area) when compared with the surface area of each of the other exterior surfaces of the housing 12.

As shown in FIG. 2, each of the radiation fins 30 is extended along the direction Y and arranged at regular intervals in the direction X. It is possible to increase the surface area of the exterior upper surface 12a of the housing 12 three times by the formation of the radiation fins 30 on the exterior upper surface 12a.

The internal cooling air supply units 13 are arranged in the housing 12. Each of the internal cooling air supply units 13 is comprised of an axial flow fan. As shown in FIG. 2, the internal cooling air supply units 13 are arranged in the direction X. This makes it possible to supply cooling air to the overall inside space 11a formed between the unit cells 11 arranged at regular intervals. Each of the internal cooling air supply units 13 is comprised of a drive motor 16 and an internal cooling fan 17. The drive motor 16 is arranged in the inside space 11a of the housing 12. The internal cooling fan 17 is driven by the drive motor 16 arranged in the inside space 11a of the housing 12.

As shown in FIG. 1, the inside cooling air in the housing 12 circulates to flow along the interior side surfaces of the housing 12 and around the unit cells 11 by the internal cooling air supply units 13. In other words, the internal cooling fan 17 supplies cooling air to pass through the surfaces of the unit cells 11 and the inferior surface corresponding to the exterior upper surface 12a of the housing 12 on which the radiation fins 30 are arranged. The cooling air flows in contact with the interior surfaces of the housing 12 and heat energy of the cooling air is transmitted to the interior surfaces of the housing 12 having the structure previously described. Specifically, the internal cooling air supply units 13 are arranged at the bottom side in the left side of the housing 12. The cooling air is sucked from the left side in the housing 12 and passes between the adjacent unit cells 11, and flows toward the upper side of the housing 12 along the direction 2. The cooling air finally flows from the right side to the left side in the direction Y at the upper side of the unit cells 11. That is, the cooling air flows and circulates in a counterclockwise direction in the inside space 11a of the housing 12. The internal cooling air supply units 13 provide the cooling air to circulate in the inside space 11a of the housing 12 without causing a leakage of the cooling air. Accordingly, the housing 12 has no inlet section and outlet section of air.

Further, an outside cooling fan 18 is arranged at the outside of the housing 12. The external cooling fan 18 is comprised of an axial flow fan. The external cooling fan 18 supplies cooling air to two surfaces in the six surfaces of the housing 12. That is, as shown in FIG. 1, the external cooling fan 18 supplies cooling air to the exterior upper surface 12a and the exterior side surface 12b of the housing 12, as shown in FIG. 1.

When the internal cooling air supply units 13 supplies cooling air (i.e. inside cooing air), the inside cooling air circulates in the inside space 11a of the housing 12, and heat exchange occurs between the circulating inside cooling air, the surfaces of the unit cells 11 and the bus bars 14. This cools the unit cells 11. The heat energy of the cooling air is radiated through the whole surfaces (such as the internal surfaces and the external surfaces) of the housing 12 to the outside of the battery pack 10. Further, because the radiation fins 30 are formed on the exterior upper surface 12a of the housing 12, a large amount of heat energy is radiated through the exterior upper surface 12a of the housing 12. Still further, because the external cooling fan 18 supplies cooling air to the exterior upper surface 12a and the exterior right side surface 12b of the housing 12, a large amount of heat energy is radiated to the outside of the battery pack 12.

A control device (not shown) controls the operation of the internal cooling air supply units 13 and the external cooling fan 18. The control device adjusts a rotation speed of each of the internal cooling air supply units 13 and the external cooling fan 18 on the basis of a temperature of the unit cells 11. When the battery pack 10 outputs a current and the battery pack 10 is charged, the unit cells 11 generate heat energy and a temperature of each of the unit cells 11 is increased. In order to increase a temperature of the unit cells 11, the control device stops the operation of each of the internal cooling air supply units 13 and the external cooling fan 18.

On the other hand, when it is necessary to decrease a temperature of the unit cells 11, the control device instructs the internal cooling air supply units 13 and the external cooling fan 18 to supply cooling air to the unit cells 11. A total amount of the cooling air (such as the inside cooling air and the outside cooling air) supplied from the internal cooling air supply units 13 and the external cooling fan 18 becomes not less than a predetermined amount (which is determined by simulation in advance, for example) in order to cause turbulence of the supplied cooling air.

When the internal cooling air supply units 13 and the external cooling fan 18 supply a smaller amount of the cooling air, the cooling air reaches a part of the unit cells 11 only and a distribution of the cooling air does not become uniform. When the internal cooling air supply units 13 and the external cooling fan 18 gradually increases the total amount (or the total flow rate) of the cooling air, the cooling air is supplied to most of the components such as the unit cells 11 stored in the housing 12. This makes it possible to generate turbulence of the supplied cooling air and to cool the group of the unit cells 11 uniformly. This phenomenon to generate turbulence of the supplied cooling air will be called to as the "turbulence effect" in the first exemplary embodiment (and the remaining exemplary embodiment which will be explained later). It is also possible to increase the total amount of the cooling air, this increases a power consumption of the internal cooling air supply units 13 and the external cooling fan 18. Accordingly, the minimum amount of cooling air to be supplied from the internal cooling air supply units 13 and the external cooling fan 18 is determined in advance in order to uniformly cool the group of the unit cells 11.

A description will now be given of experimental results regarding the cooling capability of the battery pack 10 according to the first exemplary embodiment with reference to FIG. 3.

Figure 3:
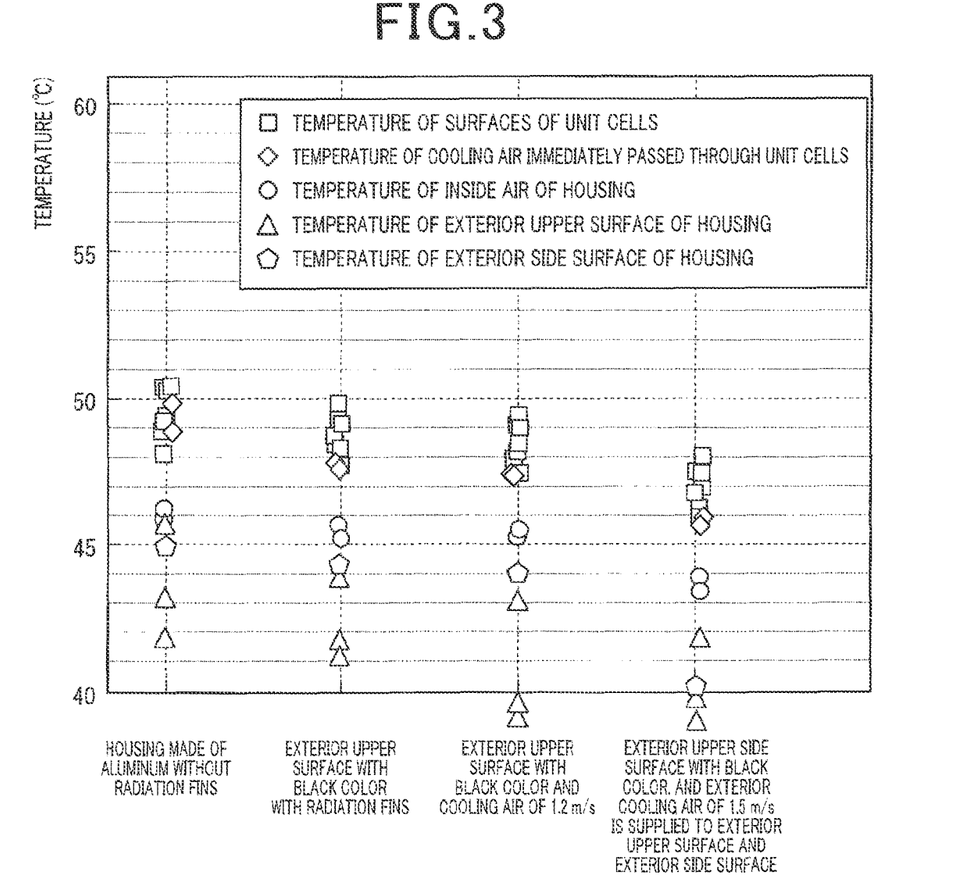
FIG. 3 is a view showing experimental results of various types of battery packs including the battery pack 10 according to the first exemplary embodiment of the present invention.

FIG. 3 is a view showing experimental results of various types of battery packs such as a comparison example, and first to third experimental examples. FIG. 3 shows the experimental results regarding cooling capability of these battery packs.

The experimental result at the leftmost side in FIG. 3 corresponds to a battery pack as a comparison sample without any radiation fins, i.e. with an aluminum cover case made of aluminum having a thickness t of 0.5 mm (t=0.5 mm).

The second experimental result counted from the leftmost side in FIG. 3 corresponds to the battery pack as a first experiment sample. The battery pack of the first experimental sample has the radiation fins 30 having the same structure of the battery pack 10 according to the first exemplary embodiment shown in FIG. 1 as previously described. Further the exterior upper surface 12a of the housing 12 has a black color. The battery pack as the first experimental sample has the internal cooling air supply units 13 without the external cooling fan 18.

The third experimental result counted from the leftmost side in FIG. 3 corresponds to the battery pack as a second experimental sample. The battery pack of the second experimental sample has a plurality of cooling airflow passages (not shown) formed in the exterior upper surface 12a of the housing 12. Further, the upper surface 12a of the housing 12 has a black color. The cooling air having a flow speed of 1.2 m/s is supplied to the cooling air passages formed in the exterior upper surface 12a of the housing 12. Each of the cooling air passages has a structure in which a top section of each of the radiation fins 30 is covered with a plate-like member. That is, the cooling air passages having a rectangle cross section are arranged along the direction X. In more detail, each of the cooling air passages having a rectangle cross section is extended in the direction Y, and the cooling air flow passages are arranged at regular intervals along the direction X. In the structure of the battery pack as the second experimental sample, the adjacent inside passages in the direction X are divided by a partition wall extended in the direction Z.

The fourth experimental result counted from the leftmost side, i.e. the rightmost experimental result in FIG. 3 corresponds to the battery pack as a third experimental sample. The battery pack of the third experimental sample has the radiation fins 30 formed at the exterior upper surface 12a of the housing 12. Further, the exterior upper surface 12a of the housing 12 has a black color. That is, the fourth experimental result shown at the rightmost side in FIG. 3 corresponds to the battery pack having the same structure of the battery pack 10 according to the first exemplary embodiment as previously described. The battery pack according to the third experimental sample has the external cooling fan 18 and the external cooling fan 18 supplies the external cooling air having a flow speed of 1.5 m/s to the exterior side surface 12b and the exterior upper surface 12a of the housing 12 on which the radiation fins 30 are formed.

As shown in FIG. 1 and FIG. 2, the unit cells 11 are completely sealed with an aluminum case and the internal cooling air supply units 13 supplies cooling air to the interior side surface corresponding to the exterior upper surface 12a of the housing 12 in order for the supplied cooling air to circulate in the inside space 11a of the housing 12.

As previously explained, the battery pack according to the third experimental sample further uses the external cooling fan 18.

The cooling air is supplied to the inside cooling air passages formed at the upper side of the inside space which corresponds to the exterior upper surface 12a of the housing 12 in the battery pack according to the second experimental sample.

The experiment was performed under the experimental condition in which the outside air around the battery packs according to the comparison sample and the first to third experimental samples has a temperature of 36° C. A temperature of each of the comparison sample and the first to third experimental samples was detected after charging and discharging were performed with a charging/discharging current of 51 amperes for three hours.

As shown in FIG. 3, reference character "□" indicates a surface temperature of the unit cell 11, reference character "◇" indicates a temperature of the inside cooling air dose to the unit cell 11, reference character "○" indicates a temperature of the inside space of the housing 12, reference character "Δ" indicates a temperature of the exterior upper surface 12a of the housing 12, and reference character "△" indicates a temperature of the exterior side surface 12b of the housing 12. A management temperature for the battery pack was 60° C. and a temperature for guaranteeing a correct output of the battery pack was 55° C.

When compared with the battery pack as the comparison example, the battery pack according to the first experimental example has an additional cooling effect of 1° C. This means that heat energy can be radiated from the exterior upper surface 12a and by natural convection from the radiation fins 30.

Although supplying the cooling air having a flow speed of 1.2 m/s to the cooling air passages formed in the inside space corresponding to the exterior upper surface 12a of the housing 12, the battery pack according to the second experimental example has approximately the same effect of the battery pack according to the first experimental example. Although the cooling air having a flow speed of 1.5 m/s is supplied and the forcedly convection is generated in the second experimental example, the natural convection from the radiation fins 30 is decreased when compared with the first experimental example.

On the other hand, the battery pack according to the third experimental example has the maximum cooling effect. In the structure of the battery pack according to the third experimental example, the cooling air supplied by the external cooling fan 18 is supplied to and cools the exterior side surface 12b having a relatively high temperature because the cooling air containing the heat energy generated in the unit cells 11 is directly and firstly supplied to the interior side surface corresponding to the exterior side surface 12b of the housing 12 in addition to the radiation from the exterior upper surface 12a and the natural convection from the radiation fins 30.

The radiation fins 30 are formed on the exterior upper surface 12a of the housing 12. In addition to this structure, the external cooling fan 18 in the battery pack according to the third experimental example supplies external cooling air having a flow speed of 1.5 m/s to the upper surface 12a. This makes it possible to significantly decrease a temperature of the exterior upper surface 12a of the housing 12, and as a result to decrease the inside temperature of the battery pack, i.e. the temperature of the unit cells 11.

As previously described in detail, the battery pack 10 according to the first exemplary embodiment (which corresponds to the third experimental example) has the improved structure in which the internal cooling fan 1 and the drive motor 16 are arranged in the inside space 11a of the housing 12, and the drive motor 16 drives the internal cooling fan 17 arranged in the inside space 11a of the housing 12. The cooling air circulates in the inside space 11a of the housing 12 by the internal cooling fan 17 in order to cool each of the unit cells 11. Further, because the internal cooling fan 17 and the drive motor 16 are arranged in the inside space 11a of the housing 12, this structure of the housing 12 makes it possible to prevent noise generated by the internal cooling fan 17 and the drive motor 16 from being leaked to the outside of the housing 12 of the battery pack 10.

The radiation fins 30 are formed on at least one of the surfaces of the housing 12. The surface on which the radiation fins 30 are formed has a superior radiation capability when compared with that of the other surfaces of the housing 12. The internal cooling fan 17 supplies the cooling air to the inside space 11a of the housing 12 so that the cooling air flows along the interior surface corresponding to the exterior upper surface 12a of the housing 12 on which the radiation fins 30 are formed. This makes it possible to cool the cooling air of a high temperature containing heat energy transmitted from the unit cells 11. That is, the heat energy generated in the unit cells 11 can be transmitted to the radiation fins 30 through the cooling air which circulates in the inside space 11a of the housing 12, and the radiation fins 30 radiate the heat energy to the outside air of the battery pack 10. This makes it possible to cool the battery pack 10 with high efficiency.

In other words, the battery pack 10 according to the first exemplary embodiment having a plurality of the unit cells 11 is capable of adjusting a temperature of the unit cells 11 and a temperature of air in the inside space 11a of the housing 12 to an uniform temperature by flowing the cooling air in the inside space 11a to circulate by using the internal cooling fan 17. In more detail, the cooling air passing through the side surface of the unit cells 11 is provided to the interior surface corresponding to the exterior upper surface 12a as a first radiation surface of the housing 12 having a superior radiation capability. Because the internal cooling fan 17 supplies cooling air in the battery pack 10 completely sealed, there is no influence of noise and it is possible to transmit heat energy generated in the unit cells 11 to the cooling air which circulates in the inside space 11a of the housing 12 by the internal cooling fan 17. Furthermore, the heat energy of the cooling air transmitted from the unit cells 11 can be radiated to the outside of the battery pack 10 through the radiation fins 30 formed on the exterior upper surface 12a of the housing 12 to which the cooling air is directly supplied. This structure makes if possible to quickly perform the heat conduction, i.e. quickly move the heat energy contained in the cooling air to the housing 12 side, and the cooling air in the battery pack 10 can maintain a relatively low temperature as low as possible.

Further, the exterior upper surface 12a, on which the radiation fins 30 are formed, has the maximum area (or a higher area) in the other surfaces of the housing 12. Because the radiation fins 30 are formed on the exterior upper surface 12a having the maximum area (or a higher area), this structure can provide the superior cooling effect.

Still further, the unit cells 11 and the inside space 11a are completely sealed in the inside of the housing 12, and the internal cooling fan 17 is arranged in the inside space 11a of the housing 12. The cooling air circulates in the inside space 11a by the internal cooling fan 17 so that the cooling air passes through the interior surfaces of the housing 12 and around the unit cells 11 in order to radiate heat energy contained in the cooling air to the outside of the housing 12. This makes it possible to flow the cooling air around the unit cells 11 and transfer the heat energy of the unit cells 11 to the inside space 11a through the cooling air. As a result, the heat energy is transmitted to the whole area of the interior surfaces of the housing 12. The heat energy is the transmitted from the whole area of the interior surfaces to the outside air of the battery pack 10. This makes it possible to cool the unit cells 11 with high efficiency.

Still further, the inside of the housing 12 is sealed completely. This structure makes it possible for the inside air to circulate in the inside of the housing 12 without any leakage. This structure makes it possible to prevent leakage of noise and smoke generated in the inside of the housing 12 to the outside of the housing 12. Furthermore, this structure makes it possible to prevent the entrance of dust and contaminations into the inside space 11a of the housing 12. Further, this structure makes it possible to prevent freezing of water in the inside of the housing 12.

Still further, the battery pack 10 according to the first exemplary embodiment is equipped with the external cooling fan 18 in addition to the internal cooling air supply units 13. The battery pack 10 according to the first exemplary embodiment can use the external cooling fan 18 for necessity to further increase the cooling capability. For example, when the battery pack 10 is mounted to a luggage, a temperature of which easily rises, if is preferable for the battery pack 10 to have and use the external cooling fan 18. This structure makes it possible to cool the inside air of the housing 12 by the heat conduction of the convection which is forcedly generated by the internal cooling air supply units 13. This structure makes if possible to further cool the radiation fins 30, etc. by the heat conduction of the convection. The heat conduction of the convection is forcedly generated by the flow of the outside air. The flow of the outside air is generated by the external cooling fan 18, and then passes on the exterior upper surface 12a of the housing 12, and supplies to the radiation fins 30.

Still further, because the outside air does not easily have a high temperature when an exterior environment is close to a compartment of a motor vehicle to which the battery pack 10 is mounted, it is not necessary to use the external cooling fan 18. In this case, the inside components of the housing 12 are cooled by the natural convection using the cooling air supplied by the infernal cooling air supply units 13. Accordingly, the battery pack 10 according to the first exemplary embodiment can be used for both a case in which the battery pack 10 is applied to a compartment of a motor vehicle and a case in which the battery pack 10 is applied to a luggage.

Second Exemplary Embodiment

A description will now be given of a battery pack 10A according to a second exemplary embodiment with reference to FIG. 4 and FIG. 5.

Figure 4:
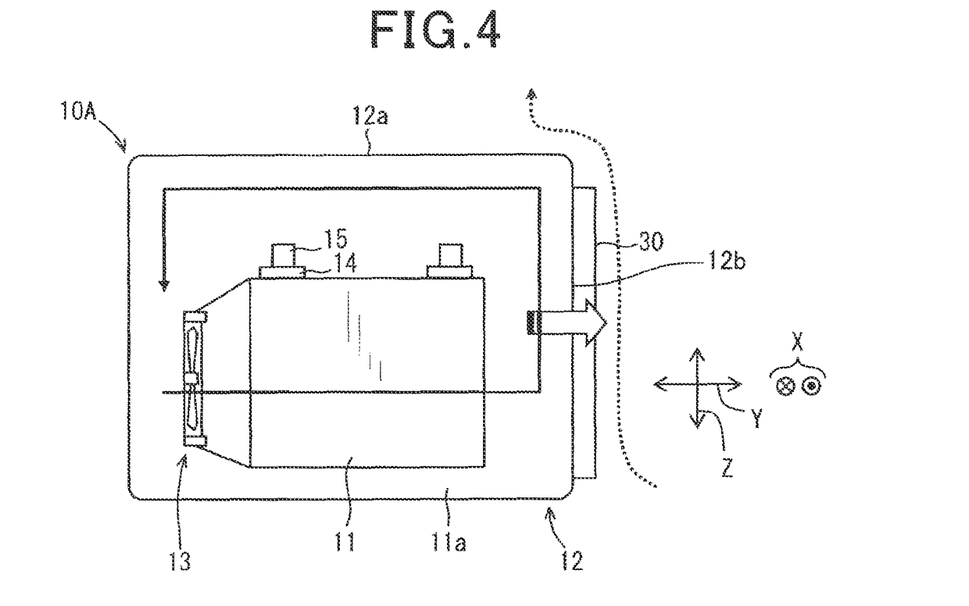
FIG. 4 is a side view showing a structure of a battery pack 10A according to a second exemplary embodiment of the present invention.

FIG. 4 is a side view showing a structure of the battery pack 10A according to the second exemplary embodiment. FIG. 5 is a plan view showing the structure of the battery pack 10A according to the second exemplary embodiment. That is, FIG. 4 shows the structure of the battery pack 10A in Y-Z plane. FIG. 5 shows the structure of the battery pack 10A in X-Y plane.

In the structure of the battery pack 10A according to the second exemplary embodiment, the radiation fins 30 are formed on the exterior side surface 12b, not formed on the exterior upper surface 12a of the housing 12. Other components of the battery pack 10A according to the second exemplary embodiment are the same of those of the battery pack 10 according to the first exemplary embodiment.

Figure 5:
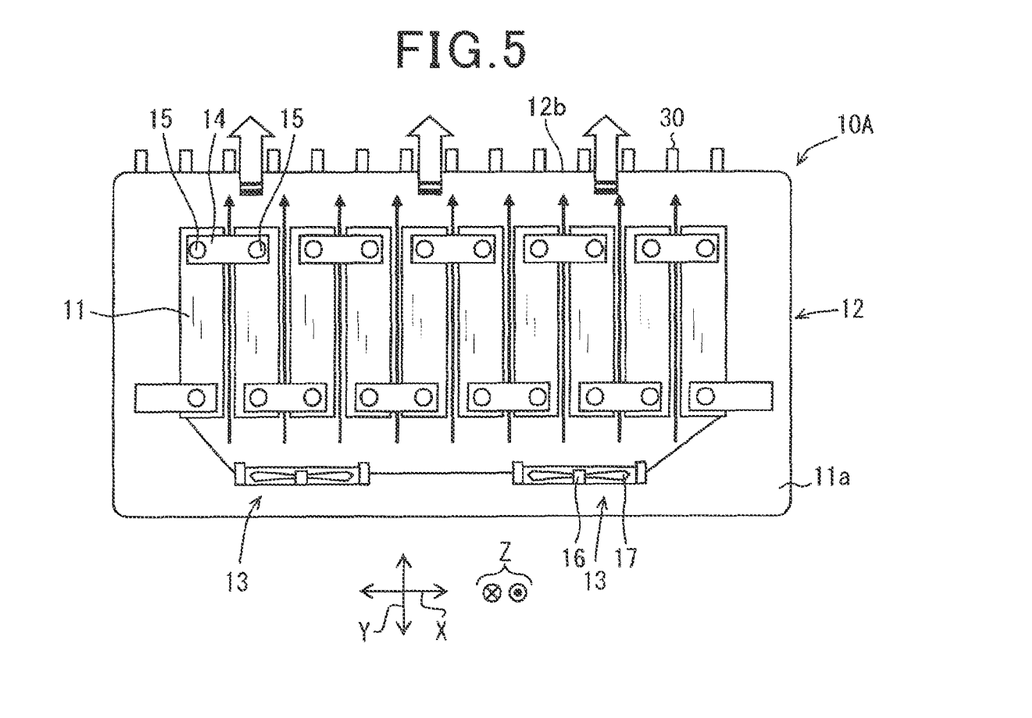
FIG. 5 is a plan view showing the structure of the battery pack 10A according to the second exemplary embodiment of the present invention.

As shown in FIG. 4 and FIG. 5, the radiation fins 30 are formed on the exterior side surface 12b of the housing 12. The inside cooling air passing through the side surface of the unit cells 11 is firstly and directly supplied to the interior side surfaces of the housing 12 which corresponding to the exterior side surface 12b of the housing 12.

Each of the radiation fins 30 is formed to extend to the direction Z and arranged at regular intervals in the direction X. It is thereby possible for the outside air containing heat energy radiated from the radiation fins 30 to rise by natural convection, as designated by the dotted line shown in FIG. 4.

This structure makes it possible to easily perform the heat exchange between the inside cooling air and the outside air by the presence of the radiation fins 30 formed on the exterior side surface 12b of the housing 12. Other components of the battery pack 10A according to the second exemplary embodiment, which are the same components of the battery pack 10 according to the first exemplary embodiment, have the same action and effects as the first exemplary embodiment.

Third Exemplary Embodiment

A description will now be given of a battery pack 10B according to a third exemplary embodiment with reference to FIG. 6 and FIG. 7.

Figure 6:
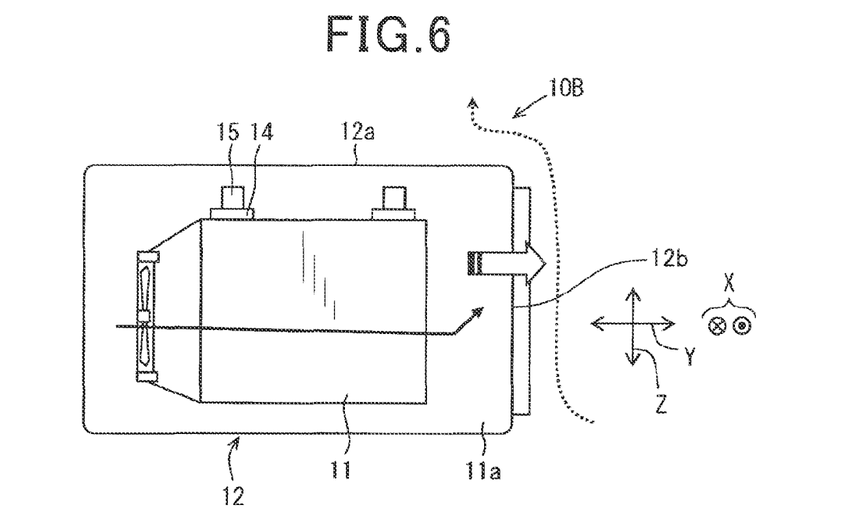
FIG. 6 is a side view showing a structure of a battery pack 10B according to a third exemplary embodiment of the present invention.
Figure 7:
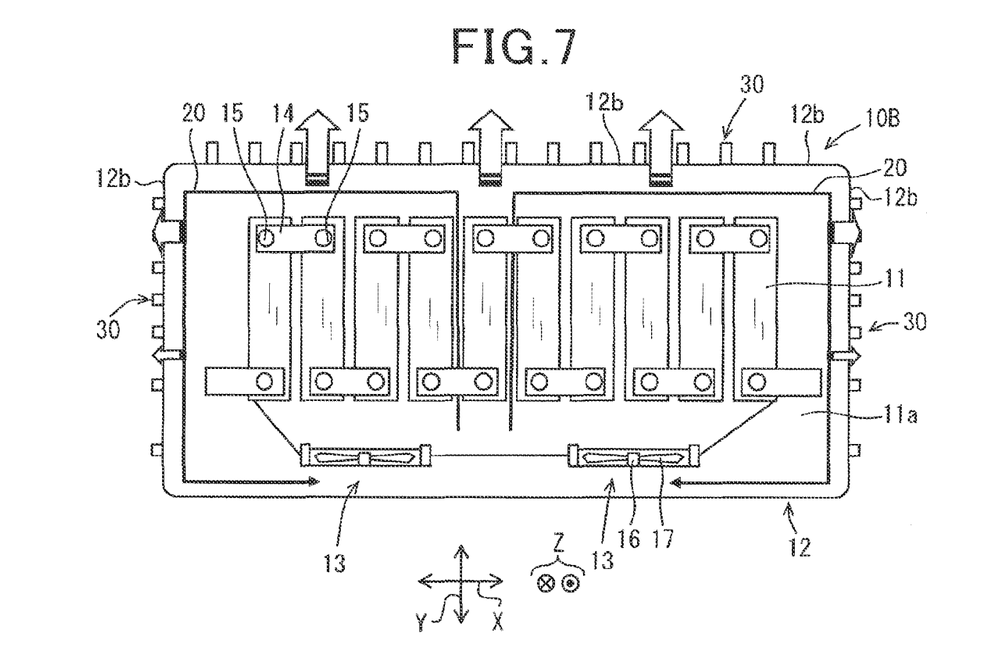
FIG. 7 is a plan view showing the structure of the battery pack 10B according to the third exemplary embodiment of the present invention.

FIG. 6 is a side view showing a structure of the battery pack 108 according to the third exemplary embodiment FIG. 7 is a plan view showing the structure of the battery pack 108 according to the third exemplary embodiment. That is, FIG. 6 shows the structure of the battery pack 108 in Y-Z plane. FIG. 7 shows the structure of the battery pack 10B in X-Y plane.

In the structure of the battery pack 10A according to the second exemplary embodiment, as previously described, the radiation fins 30 are formed on the exterior side surface 12b only of the housing 12.

On the other hand, the radiation fins 30 are formed on both the exterior side surface 12b and the exterior side surface 10c of the housing 12 in the structure of the battery pack 10B according to the third exemplary embodiment.

The radiation fins 30 are formed on at least the two exterior outside surfaces of the housing 12. In the structure of the of the battery pack 10B according to the third exemplary embodiment, the radiation fins 30 are formed on the three exterior surfaces of the housing 12 in order that the surfaces of the housing 12 at the upstream side of the cooling air have a superior radiation capability when compared with that of the other surfaces of the housing 12 at the downstream side of the cooling air.

Specifically, as shown in FIG. 7, the pitch of the radiation fins 30 is increased at the downstream side of the inside cooling air passing through an air passage 20 designated by the solid lines. Further, the air passage 20 is formed around the unit cells 11 when conserved from the exterior upper surface 12a of the housing 12. In other words, the air passage 20 is formed to flow the inside cooling air along the side surface of the whole unit cells 11.

The cooling air supplied from the internal cooling air supply units 13 passes through the side surfaces of the unit cells 11 and reaches the interior surface (having a superior radiation surface) of the housing 12 because the cooling air firstly hits this interior surface in the circulation of the cooling air in the inside space 11a of the housing 12. The cooling air then passes through the interior surface extending the direction Y shown in FIG. 7. That is, the interior surfaces of the housing has low in radiation capability when compared with the radiation capability of the interior surface of the housing 12 to which the cooling air firstly reaches and hits.

Because the cooling air immediately after passing through the side surfaces of the unit cells 11 has the maximum temperature, it is possible to radiate the heat energy of the cooling air through the interior surface corresponding to the exterior side surface having the maximum radiation capability. As a result, the interior side surfaces having a low radiation capability corresponding to the exterior side surfaces 12b can adequately cool the cooling air flowing around the unit cells 11.

The structure of the battery pack 10B according to the third exemplary embodiment shown in FIG. 6 and FIG. 7 with the irregular arrangement of the radiation fins 30 can have the adequate radiation capability while suppressing a manufacturing cost of the radiation fins 30. Other components of the battery pack 10B according to the third exemplary embodiment have the same effects of the components of the battery pack 10 according to the first and second exemplary embodiments.

Fourth Exemplary Embodiment

A description will now be given of a battery pack 10C according to a fourth exemplary embodiment with reference to FIG. 8 and FIG. 9.

Figure 8:
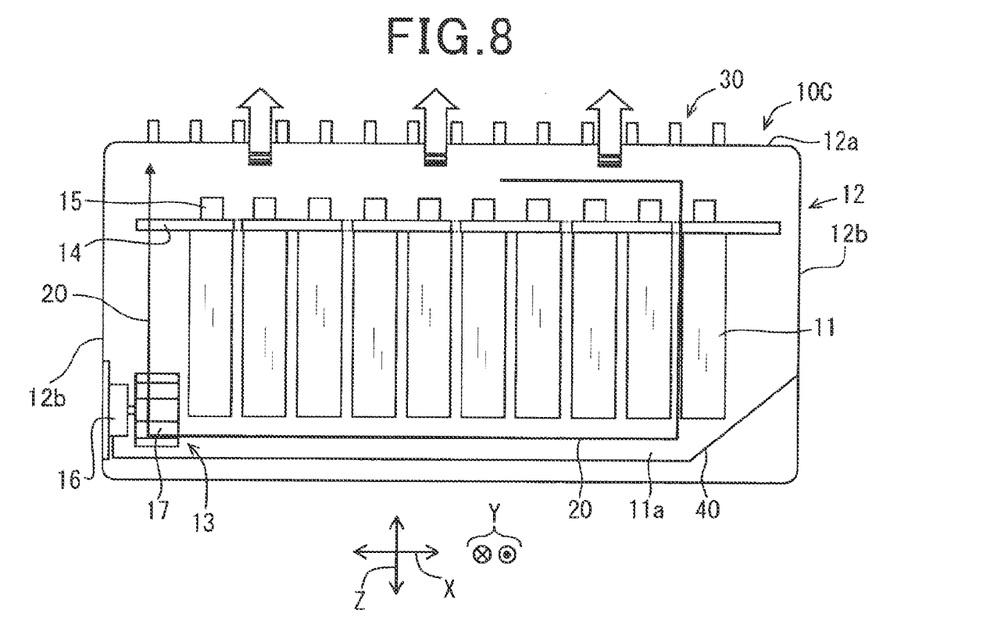
FIG. 8 is a side view showing a structure of a battery pack 10C according to a fourth exemplary embodiment of the present invention.

FIG. 8 is a side view showing a structure of the battery pack 10C according to the fourth exemplary embodiment. FIG. 9 is a plan view showing the structure of the battery pack 10C according to the fourth exemplary embodiment. That is, FIG. 8 shows the structure of the battery pack 10C in X-Z plane. FIG. 9 shows the structure of the battery pack 10C in X-Y plane.

In the structure of the battery pack 10C according to the fourth exemplary embodiment, the radiation fins 30 are formed on the exterior upper surface 12a of the housing 12, like the structure of the battery pack 10 according to the first exemplary embodiment. Further, the battery pack 10C according to the fourth exemplary embodiment has a sirocco fan as the internal cooling air supply units 13. Other components of the battery pack 10C battery pack 10C according to the fourth exemplary embodiment are the same of those of the battery pack 10 according to the first exemplary embodiment.

The sirocco fan as the internal cooling air supply units 13 sucks inside air in the housing 12 in an axial direction of the sirocco fan and outputs the cooling air along a radial direction of the sirocco fan. The sirocco fan as the internal cooling air supply units 13 is arranged at a lower left corner of the housing 12 in X-Z plane shown in FIG. 8.

Figure 9:
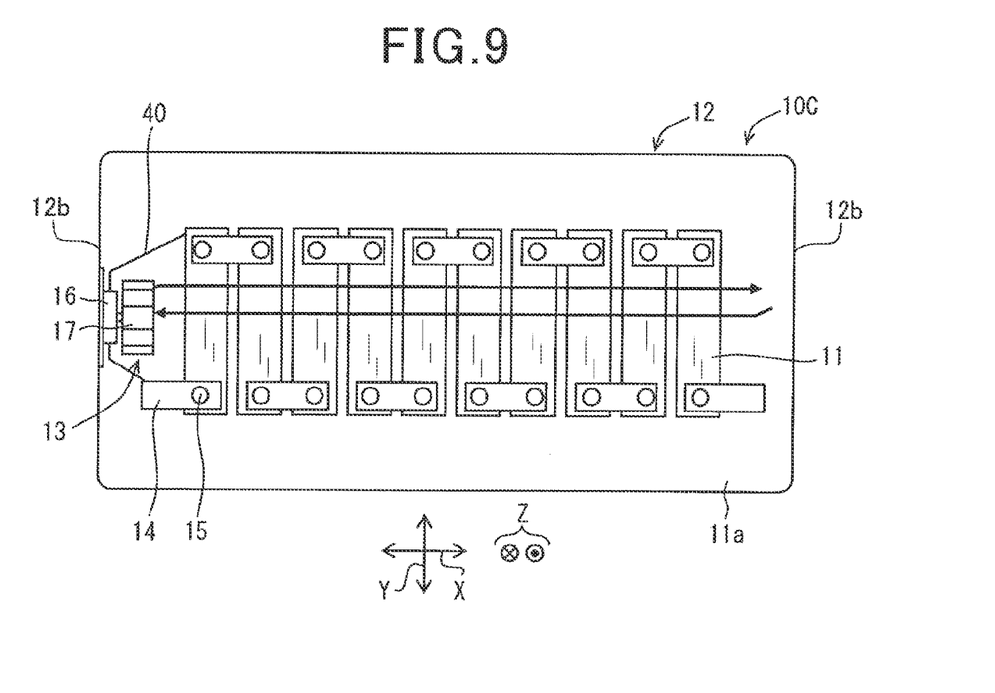
FIG. 9 is a plan view showing the structure of the battery pack 10C according to the fourth exemplary embodiment of the present invention.

Further, in X-Y plane shown in FIG. 9, the sirocco fan as the internal cooling air supply units 13 can be arrange so that the cooling air circulates along the side surface of the unit cells 11 along a direction which is perpendicular to the interior top surface (which corresponds to the exterior upper surface 12a) of the housing 12.

In X-Z plane shown in FIG. 8, the cooling air passage 20 is formed to extend along the direction Z at the left side of the unit cells 11. The cooling air passage 20 is further formed to extend along the direction X at the upper side and the bottom side of the unit cells 11.

A passage wall 40 is formed separated from an interior bottom surface of the housing 12 to form the cooling air passage 20 which extends in the direction X. This structure of the battery pack 10C according to the fourth exemplary embodiment can gather the cooling air passing through the side surfaces of the unit cells 11 and supplied to an inlet section of the sirocco fan as the internal cooling air supply units 13. In other words, the sirocco fan as the internal cooling air supply units 13 sucks the cooling air at the inlet section formed at the bottom side of the sirocco fan, and supplies the cooling air toward the upper side of the sirocco fan. The cooling air supplied from the sirocco fan flows through the cooling air passage at the upper side of the housing 12. The heat exchange is performed between the cooling air and the interior upper surface corresponding to the exterior upper surface 12a when the cooling air passes through the cooling air passage formed at the upper side of the housing 12. The heat energy of the cooling air can be radiated to the outside of the battery pack 10C through the radiation fins 30 formed on the exterior upper surface 12a of the housing 12.

Fifth Exemplary Embodiment

A description will now be given of a battery pack 10D according to a fifth exemplary embodiment with reference to FIG. 10 and FIG. 11.

Figure 10:
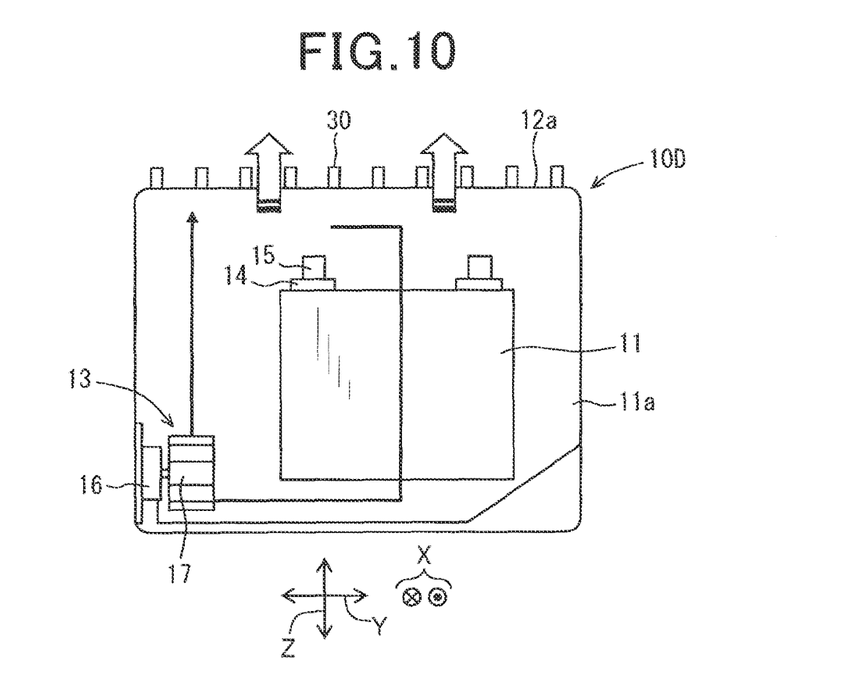
FIG. 10 is a side view showing a structure of a battery pack 10D according to a fifth exemplary embodiment of the present invention.

FIG. 10 is a side view showing a structure of the battery pack 10D according to the fifth exemplary embodiment. FIG. 11 is a plan view showing the structure of the battery pack 10D according to the fifth exemplary embodiment. FIG. 10 shows the structure of the battery pack 10D in Y-Z plane. FIG. 11 shows the structure of the battery pack 10D in X-Y plane.

Figure 11:
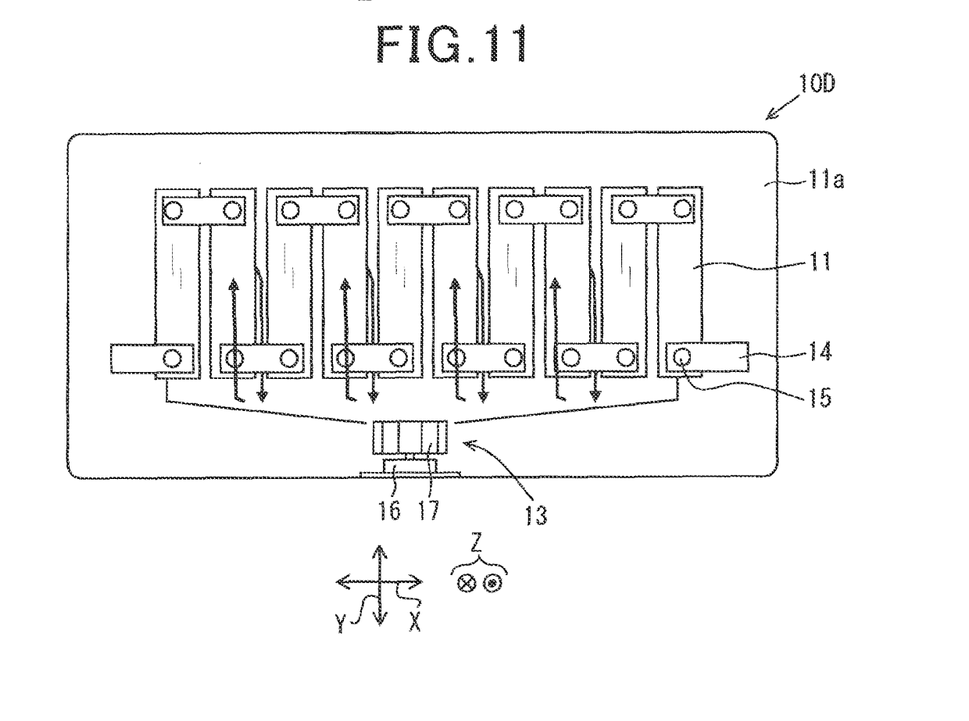
FIG. 11 is a plan view showing the structure of the battery pack 10D according to the fifth exemplary embodiment of the present invention.

In the structure of the battery pack 10D according to the fifth exemplary embodiment shown in FIG. 10 and FIG. 11, the radiation fins 30 are formed on the exterior upper surface 12a of the housing 12, like the structure of the battery pack 10C according to the fourth exemplary embodiment. Further, the battery pack 10D according to the fifth exemplary embodiment has the sirocco fan as the internal cooling air supply units 13. A difference in structure between the battery pack 10C and the battery pack 10D is the arrangement of the sirocco fan as the internal cooling air supply units 13.

Other components of the battery pack 10D according to the fifth exemplary embodiment are the same of those of the battery pack 10 according to the first exemplary embodiment (and the fourth exemplary embodiment).

In the structure of the battery pack 10D according to the fifth exemplary embodiment, the sirocco fan as the internal cooling air supply units 13 is arranged so that the cooling air circulates to a direction which is in parallel to the side surfaces of the unit cells 11 as shown in FIG. 10 and FIG. 11.

The battery pack 10D according to the fifth exemplary embodiment shown in FIG. 10 and FIG. 11 having the structure previously described have the same action and effects of the battery pack 10C according to the fourth exemplary embodiment shown in FIG. 9 and FIG. 10.

It is possible to arrange the sirocco fan as the internal cooling air supply units 13 at the optimum position on the basis of the demands and the structure such as the arrangement space for the housing 12. For example, when the housing 12 has an adequate arrangement space along the direction X, the structure of the battery pack 10C according to the fourth exemplary embodiment is used. When the housing 12 has an adequate arrangement space along the direction Y, the structure of the battery pack 10D according to the fifth exemplary embodiment is used.

Sixth Exemplary Embodiment

A description will now be given of a battery pack 10E according to a fifth exemplary embodiment with reference to FIG. 12 and FIG. 13.

Figure 12:
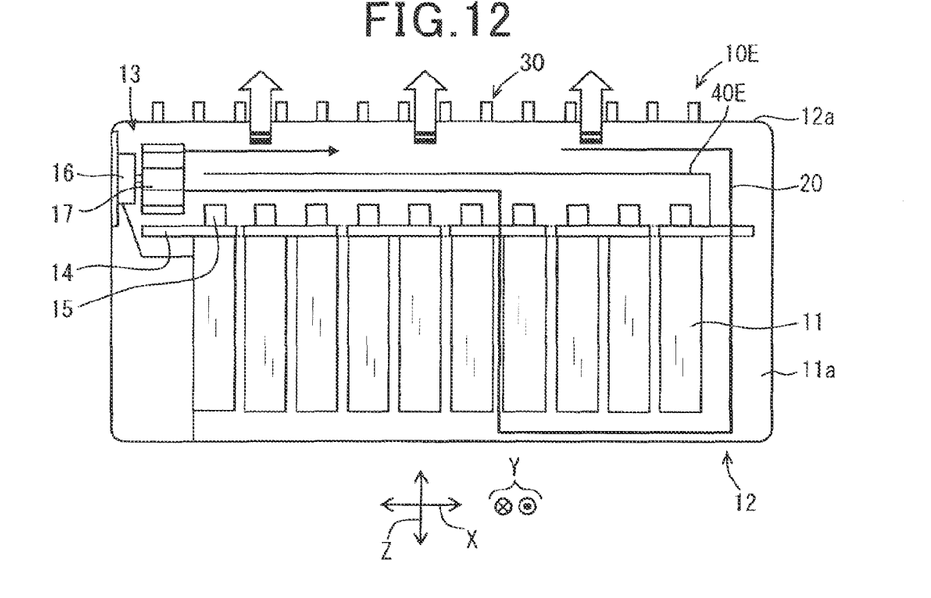
FIG. 12 is a side view showing a structure of a battery pack 10E according to a sixth exemplary embodiment of the present invention.

FIG. 12 is a side view showing a structure of the battery pack 10F according to the sixth exemplary embodiment. FIG. 13 is a plan view showing the structure of the battery pack 10E according to the sixth exemplary embodiment. That is, FIG. 12 shows the structure of the battery pack 10E in X-Z plane. FIG. 13 shows the structure of the battery pack 10E in X-Y plane.

Figure 13:
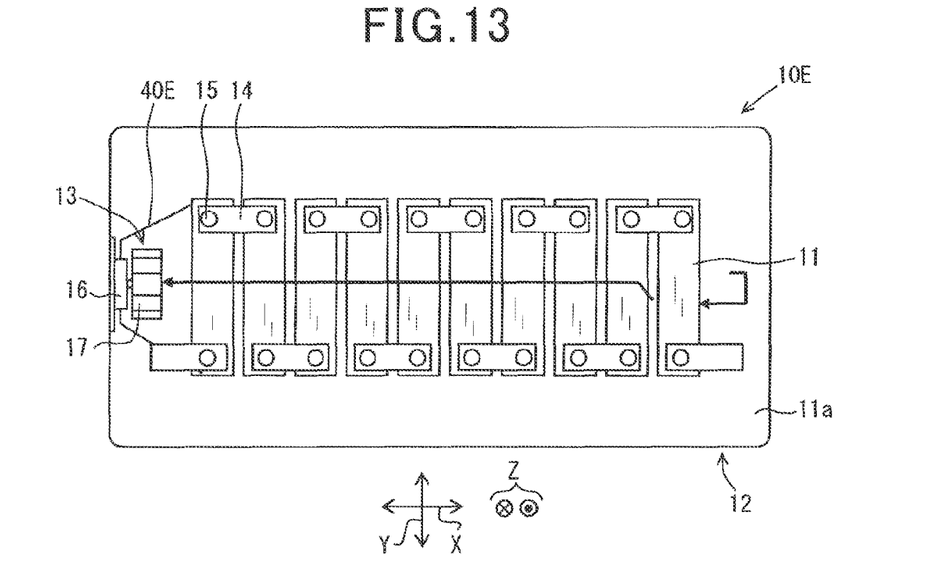
FIG. 13 is a plan view showing the structure of the battery pack 10E according to the sixth exemplary embodiment of the present invention.

In the structure of the battery pack 10E according to the sixth exemplary embodiment shown in FIG. 12 and FIG. 13, the radiation fins 30 are formed on the exterior upper surface 12a of the housing 12, like the structure of the battery pack 10 according to the first exemplary embodiment. Further, the battery pack 10E according to the sixth exemplary embodiment uses a centrifugal sirocco fan as the internal cooling air supply units 13.

A structural difference between the battery pack 10E according to the sixth exemplary embodiment and the battery packs 10C and 10D according to the fourth and fifth exemplary embodiments is the arrangement place of the centrifugal sirocco fan as the infernal cooling air supply units 13.

In X-Z plane shown in FIG. 12, the centrifugal sirocco fan as the internal cooling air supply units 13 is arranged at the upper left side of the housing 12 so that the cooling air circulates in a direction which is perpendicular to the side surfaces of the unit cells 11. Further, as shown in FIG. 12, a cooling air passage wall 40E is formed so that the cooling air passage wall 40E is separated from the interior top surface of the housing 12, which corresponds to the exterior upper surface 12a of the housing 12 on which the radiation fins 30 are arranged. The cooling air passage wall 40E has a cross section having a character L like shape. The cooling air passage wall 40E divides the upper side space over the unit cells 11 in the direction Z of the housing 12 in X-Z plane shown in FIG. 12. The cooling air passage wall 40E forms the cooling air passage 20 which extends in the direction Z at the right side shown in FIG. 12.

As shown in FIG. 12, the cooling air passing through the side surfaces of the unit cells 11 flows toward the upward in the housing 12, and turns toward the left side below the cooling air passage wall 40E. After this, the centrifugal sirocco fan as the internal cooling air supply units 13 sucks the cooling air. The cooling air discharged from the centrifugal sirocco fan as the internal cooling air supply units 13 flows in the cooling air passage 20 formed over the cooling air passage wall 40E toward the right side shown in FIG. 12. The cooling air then flows toward the bottom side along the interior side surface of the housing 12.

The cooling air supplied from the centrifugal sirocco fan as the internal cooling air supply units 13 flows in order through the surfaces of the unit cells 11, the bus bar 14 and the interior top surface of the housing 12, which corresponding to the exterior upper surface 12a on which the radiation fins 30 are arranged. In particular, the bus bar 14 has a temperature which is the highest temperature in the components arranged in the inside space 11a of the housing 12. The unit cells 11 has a second high temperature, i.e. which is lower than the temperature of the bus bar 14, but higher than the components other than the bus bar 14. Accordingly, the structure of the battery pack 10E according to the sixth exemplary embodiment makes the flow of the cooling air from a high temperature side to a low temperature side in the inside space 11a of the housing 12. This makes it possible to cool the bus bar 14 even if a temperature of the cooling air, after passing through the side surfaces of the unit cell 11, becomes high. Thus, the battery pack 10E according to the sixth exemplary embodiment has the structure to supply the cooling air with high efficiency and the improved cooling capability.

Seventh Exemplary Embodiment

A description will now be given of a battery pack 10F according to a seventh exemplary embodiment with reference to FIG. 14.

Figure 14:
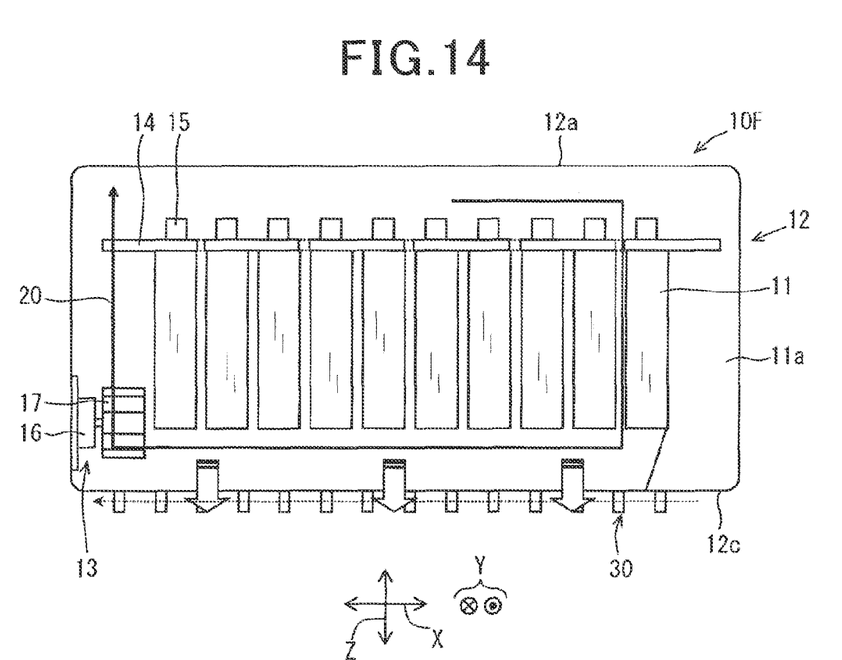
FIG. 14 is a side view showing a structure of a battery pack 10F according to a seventh exemplary embodiment of the present invention.

FIG. 14 is a side view showing a structure of the battery pack 10F according to the seventh exemplary embodiment. That is, FIG. 14 shows the structure of the battery pack 10F in X-Z plane.

In the structure of the battery pack 10F according to the seventh exemplary embodiment shown in FIG. 14, the radiation fins 30 are formed on an exterior bottom surface 12c of the housing 12. Further, in the structure of the battery pack 10F according to the seventh exemplary embodiment, a centrifugal sirocco fan is used as the internal cooling air supply units 13, similar to the structure of the battery pack 10D according to the sixth exemplary embodiment as previously described. Further, in the structure of the battery pack 10F, a cooling medium is supplied to flow along the bottom surface of the housing 12 along the direction X in X-Z plane shown in FIG. 14.

The radiation fins 30 are formed on an exterior bottom surface 12c of the housing 12, and the cooling medium sued as water is supplied to flow along the interior bottom surface of the housing 12. In the structure of the battery pack 10F according to the seventh exemplary embodiment, the heat exchange is performed between the cooling medium and the cooling air when the cooling air having the highest temperature, because of after passing on the side surfaces of the unit cells 11, flows along the interior bottom surface which correspond to the exterior bottom surface 12c of the housing 12. This makes it possible to improve the cooling capability of the battery pack 10F.

(Other Modifications)

The concept of the present invention is not limited by the structure of the battery pack according to each of the first to seventh exemplary embodiments previously described.

In the structure of the battery pack 10 according to the first exemplary embodiment, the unit cells 11 are arranged so that the side surface of each of the unit cells 11 faces to each other. However, the concept of the present invention is not limited by this arrangement. For example, it is possible to arrange the unit cells in an optimum arrangement pattern, for example, in a pattern having two or more columns and in a zigzag pattern so long as the forcedly supplied cooling air uniformly cools each of the unit cells 11.

In the structure of the battery pack 10 according to the first exemplary embodiment, the internal cooling fan 17 supplies cooling air so that the cooling air passes on the side surfaces of the unit cells 11 and the interior surface of the housing 12, which corresponding to the exterior upper surface 12a on which the radiation fins 30 are formed. However, the concept of the present invention is not limited by this structure in which the cooling air passes on the side surfaces of the unit cells 11. The surfaces of the unit cells 11 indicate the surfaces through which heat energy generated in the inside of each of the unit cells 11 is radiated. Accordingly, when an additional promoting section is formed on the surface of the unit cell 11, the surfaces of the unit cells 11 contain the additional promoting section.

In the structure of the battery pack 10 according to the first exemplary embodiment, the radiation fins 30 are formed on the exterior upper surface 12a of the housing 12 to project from the exterior upper surface 12a. However, the concept of the present invention is not limited by this. For example, it is possible to form the radiation fins 30 on the interior surface of the housing in addition to the radiation fins 30 formed on the exterior upper surface 12a of the housing 12.

It is also possible to form the exterior upper surface 12a in an uneven section. This makes it possible to radiate the heat energy of the cooling air through the uneven surface of the exterior upper surface 12a without using the radiation fins 30. In addition, it is possible to have the radiation fins 30 with a color such as black having a superior radiation function.

Each of the battery packs 10 and 10A to 10F according to the first to seventh exemplary embodiments is mounted to motor vehicles such as hybrid motor vehicle. However, the concept of the present invention is not limited by this. For example, it is possible to mount the battery pack according to the present invention to aircrafts, ships, and various types of devices.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A battery pack comprising:
   a plurality of unit cells;
   a housing having interior surfaces and exterior surfaces, in which the plurality of the unit cells are stored in an inside space of the housing and the inside space of the housing is completely sealed, the exterior surface of the housing being exposed outside air;
   an internal cooling fan arranged in the inside space of the housing and configured to supply internal cooling air to the inside space of the housing; and
   a radiation section formed on at least a first exterior surface in the exterior surfaces of the housing, and the radiation section comprising a plurality of radiation fins arranged at predetermined intervals to increase a radiation capability thereof to be higher than a radiation capability of each of the other exterior surfaces,
   wherein the internal cooling fan is arranged in the inside space of the housing so that the internal cooling air passes along surfaces of the plurality of the unit cells and then flows along the interior surfaces of the housing having the radiation section which is formed on at least the first exterior surface of the housing.

2. The battery pack according to claim 1, wherein the first exterior surface has a higher surface area when compared with a surface area of each of the other exterior surfaces.

3. The battery pack according to claim 1, wherein the first exterior surface comprises at least two or more the exterior surfaces of the housing, and one of the two exterior surfaces forming the first exterior surface is arranged at an upstream side of the internal cooling air, and has a radiation capability which is higher than a radiation capability of the other exterior surfaces arranged at a downstream side of the internal cooling air.

4. The battery pack according to claim 2, wherein the first exterior surface comprises at least two or more the exterior surfaces of the housing, and one of the exterior surfaces forming the first exterior surface is arranged at an upstream side of the internal cooling air, and has a radiation capability which is higher than a radiation capability of the other exterior surface arranged at a downstream side of the internal cooling air.

5. The battery pack according to claim 1, wherein the plurality of the unit cells are electrically connected together through bus bars, and the internal cooling fan supplies in turn the internal cooling air to the surfaces of the plurality of the unit cells, the bus bars, and the interior surfaces of the housing.

6. The battery pack according to claim 2, wherein the plurality of the unit cells are electrically connected together through bus bars, and the internal cooling fan supplies in turn the internal cooling air to the surfaces of the plurality of the unit cells, the bus bars, and the interior surfaces of the housing.

7. The battery pack according to claim 3, wherein the plurality of the unit cells are electrically connected together through bus bars, and the internal cooling fan supplies in turn the internal cooling air to the surfaces of the plurality of the unit cells, the bus bars, and the interior surface of the housing.

8. The battery pack according to claim 4, wherein the plurality of the unit cells are electrically connected together through bus bars, and the internal cooling fan supplies in turn the internal cooling air to the surfaces of the plurality of the unit cells, the bus bars, and the interior surfaces of the housing.

9. The battery pack according to claim 1, wherein the internal cooling fan is a sirocco fan arranged to supply the cooling air to flow in a direction which is perpendicular to side surfaces of the battery pack.

10. The battery pack according to claim 1, wherein the internal cooling fan is a sirocco fan arranged to supply the cooling air to flow in a direction which is horizontal to side surfaces of the battery pack.

11. The battery pack according to claim 1, wherein the radiation section comprises an uneven surface.

12. The battery pack according to claim 1, wherein the plurality of radiation fins in the radiation section are arranged in a uniform pitch.

13. The battery pack according to claim 1, wherein a pitch of the radiation fins in the radiation section becomes larger at a downstream side of the flow of the cooling air.

14. The battery pack according to claim 1, wherein each of the plurality of radiation fins has a plurality of surfaces, with a surface, of each of the plurality of radiation fins, having the largest surface area being arranged in a plane that is perpendicular to a stacking direction in which the plurality of unit cells are stacked.

15. The battery pack according to claim 1, wherein each of the plurality of radiation fins has rectangular cross section, with a side of the rectangular cross section having a longer length extending in a direction that is perpendicular to a direction in which the plurality of the unit cells are arranged.

16. The battery pack according to claim 1, wherein a direction of a uniform pitch at which the plurality of the radiation fins are arranged is the same direction at which the plurality of the unit cells are arranged.

17. The battery pack according to claim 1, wherein each of the plurality of radiation fins in the radiation section is arranged to extended approximately parallel to a first direction along which external cooling air flows outside of the housing, and the plurality of radiation fins are arranged at the predetermined intervals in a direction which is perpendicular to the first direction.

* * * * *